(12) United States Patent
Schaut et al.

(10) Patent No.: US 11,834,369 B2
(45) Date of Patent: Dec. 5, 2023

(54) ION EXCHANGEABLE BOROSILICATE GLASS COMPOSITIONS AND GLASS ARTICLES FORMED FROM THE SAME

(71) Applicant: CORNING INCORPORATED, Corning, NY (US)

(72) Inventors: Robert Anthony Schaut, Horseheads, NY (US); Wendell Porter Weeks, Jr., Clayton, MO (US)

(73) Assignee: CORNING INCORPORATED, Corning, NY (US)

( * ) Notice: Subject to any disclaimer, the term of this patent is extended or adjusted under 35 U.S.C. 154(b) by 35 days.

(21) Appl. No.: 17/492,951

(22) Filed: Oct. 4, 2021

(65) Prior Publication Data

US 2022/0024807 A1 Jan. 27, 2022

Related U.S. Application Data

(63) Continuation of application No. 16/533,954, filed on Aug. 7, 2019, now Pat. No. 11,168,019.

(Continued)

(51) Int. Cl.
*C03C 3/118* (2006.01)
*C03C 3/11* (2006.01)
(Continued)

(52) U.S. Cl.
CPC ............. *C03C 3/118* (2013.01); *C03C 3/091* (2013.01); *C03C 3/11* (2013.01); *C03C 4/18* (2013.01); *C03C 2204/00* (2013.01)

(58) Field of Classification Search
CPC .......... C03C 3/118; C03C 3/091; C03C 3/11; C03C 4/18; C03C 2204/00; C03C 4/20; C03C 21/002
See application file for complete search history.

(56) References Cited

U.S. PATENT DOCUMENTS 6,204,212 B1 ‡ 3/2001 Kunert .................... C03C 3/095
501/15
9,034,442 B2 ‡ 5/2015 Chang .................... B65D 23/02
428/34.4

(Continued)

FOREIGN PATENT DOCUMENTS

CN 1392868 A 1/2003
CN 105263875 A 1/2016
(Continued)

OTHER PUBLICATIONS

International Search Report and Wri I i en Opinion of the European International Searching Authority; PCT/US2019/045095; dated Nov. 15, 19; 12 pgs.‡

(Continued)

*Primary Examiner* — Karl E Group
*Assistant Examiner* — Cameron K Miller
(74) *Attorney, Agent, or Firm* — F. Brock Riggs

(57) ABSTRACT

A glass article may include $SiO_2$, $Al_2O_3$, $B_2O_3$, at least one alkali oxide, and at least one alkaline earth oxide. The glass article may be capable of being strengthened by ion exchange. The glass article has a thickness t. The concentration(s) of the constituent components of the glass may be such that: $13 \leq 0.0308543*(188.5+((23.84*Al_2O_3)+(-16.97*B_2O_3)+(69.10*Na_2O)+(-213.3*K_2O))+((Na_2O-7.274)^2*(-7.3628)+(Al_2O_3-2.863)*(K_2O-0.520)*(321.5)+(B_2O_3-9.668)*(K_2O-0.520)*(-39.74)))/t$.

35 Claims, 2 Drawing Sheets

Related U.S. Application Data

(60) Provisional application No. 62/718,213, filed on Aug. 13, 2018.

(51) Int. Cl.
*C03C 4/18* (2006.01)
*C03C 3/091* (2006.01)

(56) References Cited

U.S. PATENT DOCUMENTS

| | | | | |
|---|---|---|---|---|
| 9,145,333 | B1 ‡ | 9/2015 | Dejneka | C03C 3/091 |
| 9,815,733 | B2 ‡ | 11/2017 | Dejneka | C03C 3/097 |
| 9,850,162 | B2 ‡ | 12/2017 | DeMartino | C03C 23/007 |
| 10,350,139 | B2 ‡ | 7/2019 | DeMartino | C03C 21/002 |
| 2003/0087745 | A1 ‡ | 5/2003 | Peuchert | C03C 4/20 |
| | | | | 501/67 |
| 2015/0037571 | A1 ‡ | 2/2015 | Danielson | C03C 3/091 |
| | | | | 428/336 |
| 2016/0107924 | A1 ‡ | 4/2016 | Yamamoto | C03C 4/20 |
| | | | | 501/67 |
| 2018/0257975 | A1 | 9/2018 | Kimura et al. | |
| 2019/0382303 | A1* | 12/2019 | Grimm | C03C 3/118 |

FOREIGN PATENT DOCUMENTS

| | | | |
|---|---|---|---|
| CN | 106746599 | A | 5/2017 |
| CN | 107949547 | A | 4/2018 |
| EP | 3345876 | A1 ‡ | 7/2018 |
| EP | 3345876 | A1 | 7/2018 |
| FR | 2542727 | A1 ‡ | 9/1984 |
| FR | 2542727 | A1 | 9/1984 |
| JP | 2014-169209 | A | 9/2014 |
| JP | 2015-098430 | A | 5/2015 |

OTHER PUBLICATIONS

Singapore Written Opinion and Search Report dated Jan. 25, 2021, for SG Patent Application No. 10201705439Y. pp. 1-10.‡
International Search Report and Written Opinion of the International Searching Authority; PCT/US19/045095; dated Nov. 15, 2019; 10 Pages; European Patent Office.
Chinese Patent Application No. 201980066786.8, Office Action dated Aug. 25, 2022, 5 pages (English translation only), Chinese Patent Office.
Taiwanese Patent Application No. 108128704, Office Action, dated Mar. 8, 2023, 1 page; Taiwanese Patent Office.

* cited by examiner
‡ imported from a related application

ION EXCHANGEABLE BOROSILICATE GLASS COMPOSITIONS AND GLASS ARTICLES FORMED FROM THE SAME

CROSS REFERENCE TO RELATED APPLICATION

This application is a continuation of U.S. patent application Ser. No. 16/533,954 filed on Aug. 7, 2019, which claims the benefit of priority under 35 U.S.C. § 119 of U.S. Provisional Application Ser. No. 62/718,213 filed on Aug. 13, 2018, the content of which is relied upon and incorporated herein by reference in its entirety.

FIELD

The present specification generally relates to glass compositions and, more specifically, to ion exchangeable borosilicate glass compositions and glass articles, such as glass pharmaceutical packages, formed from the same.

Technical Background

Historically, glass has been used as the preferred material for packaging pharmaceuticals because of its hermeticity, optical clarity and excellent chemical durability relative to other materials. Specifically, the glass used in pharmaceutical packaging must have adequate chemical durability so as not to affect the stability of the pharmaceutical compositions contained therein. Glasses having suitable chemical durability include those glass compositions within the ASTM standard 'Type 1A' and 'Type 1B' glass compositions which have a proven history of chemical durability.

A concern for pharmaceutical manufacturers is maintaining the sterility of package contents from filling through transport and storage until use. While glass containers are superior to many alternative materials, they are not unbreakable and occasionally experience damage from handling and transport. Cracks resulting from such damage may compromise the hermeticity and sterility of the contents but not leading to catastrophic failure of the package. Such cracks may result in recalls when detected by a health care professional or patient at the point of use, and can be costly to the pharmaceutical manufacturer.

Accordingly, a need exists for alternative glass compositions for use in glass articles such as glass pharmaceutical packages and similar applications.

SUMMARY

According to one embodiment, a glass article may include $SiO_2$, $Al_2O_3$, $B_2O_3$, at least one alkali oxide, and at least one alkaline earth oxide. The glass article may be capable of being strengthened by ion exchange. The glass article has a thickness t. The concentration(s) of the constituent components of the glass may be such that: $13 \leq 0.0308543*(188.5+423.84*Al_2O_3)+(-16.97*B_2O_3)+(69.10*Na_2O)+(-213.3*K_2O))+((Na_2O-7.274)^2*(-7.3628)+(Al_2O_3-2.863)*(K_2O-0.520)*(321.5)+(B_2O_3-9.668)*(K_2O-0.520)*(-39.74)))/T$.

According to another embodiment, a glass article may include: greater than or equal to 72 mol. % and less than or equal to 82 mol. % $SiO_2$; greater than or equal to 1 mol. % and less than or equal to 6 mol. % $Al_2O_3$; greater than or equal to 3 mol. % and less than or equal to 16 mol. % $B_2O_3$; greater than or equal to 5 mol. % and less than or equal to 12 mol. % $Na_2O$; greater than or equal to 0.30 mol. % and less than or equal to 1.5 mol. % $K_2O$; greater than or equal to 0.10 mol. % and less than or equal to 6.00 mol. % MgO; and greater than or equal to 0.50 mol. % and less than or equal to 4.0 mol. % CaO. The glass article may be capable of being strengthened by ion exchange and may have a thickness t. The concentration(s) of the constituent components of the glass may be such that: $13 \leq 0.0308543*(188.5+423.84*Al_2O_3)+(-16.97*B_2O_3)+(69.10*Na_2O)+(-213.3*K_2O))+((Na_2O-7.274)^2*(-7.3628)+(Al_2O_3-2.863)*(K_2O-0.520)*(321.5)+(B_2O_3-9.668)*(K_2O-0.520)*(-39.74)))/t$ Additional features and advantages of the borosilicate glass compositions and glass articles formed from the same described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
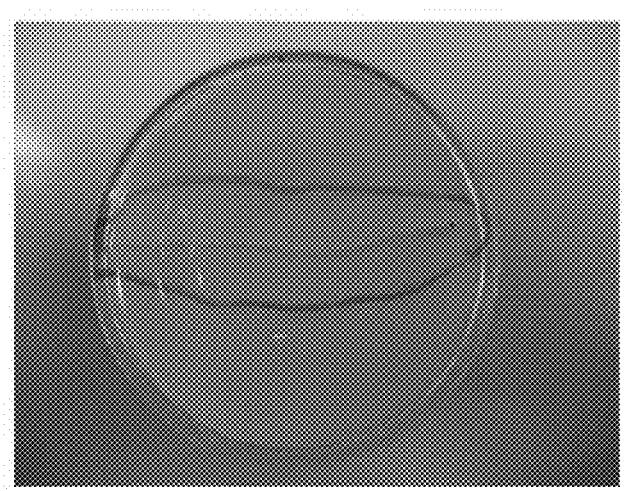
FIG. 1 is a photograph depicting a crack in a prior art glass pharmaceutical package without catastrophic failure of the glass pharmaceutical package.

Reference will now be made in detail to embodiments of borosilicate glass compositions and glass articles formed therefrom which are amenable to ion exchange strengthening and are suitable for use as pharmaceutical packages. Whenever possible, the same reference numerals will be used throughout the drawings to refer to the same or like parts. According to one embodiment, a glass article may include $SiO_2$, $Al_2O_3$, $B_2O_3$, at least one alkali oxide, and at least one alkaline earth oxide. The glass article may be capable of being strengthened by ion exchange. The glass article has a thickness t. The concentration(s) of the constituent components of the glass may be such that: $13 \leq 0.0308543*(188.5+((23.84*Al_2O_3)+(-16.97*B_2O_3)+(69.10*Na_2O)+(-213.3*K_2O))+((Na_2O-7.274)^2*(-7.3628)+(Al_2O_3-2.863)*(K_2O-0.520)*(321.5)+(B_2O_3-9.668)*(K_2O-0.520)*(-39.74)))/t$. Various embodiments of borosilicate glass compositions and glass articles, such as glass pharmaceutical packages, formed from the same will be described in further detail herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

The term "softening point," as used herein, refers to the temperature at which the viscosity of the glass composition is $1 \times 10^{7.6}$ poise.

The term "annealing point," as used herein, refers to the temperature at which the viscosity of the glass composition is $1 \times 10^{13}$ poise.

The terms "strain point" and "$T_{strain}$," as used herein, refers to the temperature at which the viscosity of the glass composition is $3 \times 10^{"}$ poise.

The term "CTE," as used herein, refers to the coefficient of thermal expansion of the glass composition over a temperature range from about room temperature (RT) to about 300° C.

Compressive stress is determined with a fundamental stress meter (FSM) instrument, such as the FSM-6000, manufactured by Orihara Co., Ltd. (Tokyo, japan), with the compressive stress value based on the measured stress optical coefficient (SOC). The FSM instrument couples light into and out of the birefringent glass surface. The measured birefringence is then related to stress through a material constant, the stress-optic or photoelastic coefficient (SOC or PEC) and two parameters are obtained: the maximum surface compressive stress (CS) and the exchanged depth of layer (DOL).

Glass compositions may be grouped into families by their common constituents. More specifically, the names of the 2 or 3 most abundant constituents of the glass are arranged, typically in ascending order, into a glass family name. For example, glasses containing substantial concentrations of sodium, aluminum, boron and silicon could be referred to as: sodium borosilicates, borosilicates, or aluminoborosilicates. However, the family name is not restrictive to one or two specific glass compositions, but rather any glass containing those elements as primary constituents. Thus, many glasses containing boron and silicon may be called borosilicates, but not all borosilicates necessarily meet the ASTM E438 requirements for Type I glasses. The terms "borosilicate glass" and "borosilicate glass composition," as used herein, refer to a glass compositions which comprise boron at concentrations in excess of 1 wt. % of the glass composition.

In the embodiments of the glass compositions described herein, the concentrations of constituent components (e.g., Sift, $Al_2O_3$, and the like) are specified in mole percent (mol. %) on an oxide basis, unless otherwise specified.

The terms "free" and "substantially free," when used to describe the concentration and/or absence of a particular constituent component in a glass composition, means that the constituent component is not intentionally added to the glass composition. However, the glass composition may contain traces of the constituent component as a contaminant or trace in amounts of less than 0.01 mol. %.

The term "chemical durability," as used herein, refers to the ability of the glass composition to resist degradation upon exposure to specified chemical conditions. Specifically, the chemical durability of the glass compositions described herein was assessed according to three established material testing standards: DIN 12116 dated March 2001 and entitled "Testing of glass—Resistance to attack by a boiling aqueous solution of hydrochloric acid—Method of test and classification"; ISO 695:1991 entitled "Glass—Resistance to attack by a boiling aqueous solution of mixed alkali—Method of test and classification"; and ISO 720: 1985 entitled "Glass—Hydrolytic resistance of glass grains at 121 degrees C.—Method of test and classification." The chemical durability of the glass may also be assessed according to ISO 719:1985 "Glass—Hydrolytic resistance of glass grains at 98 degrees C. —Method of test and classification," in addition to the above referenced standards. The ISO 719 standard is a less aggressive version of the ISO 720 standard and, as such, it is believed that a glass which meets a specified classification of the ISO 720 standard will also meet the corresponding classification of the ISO 719 standard.

For glass samples that are strengthened, such as by chemical strengthening or chemical tempering by ion exchange, the compressive stress in the glass is determined with a fundamental stress meter (FSM) instrument, with the compressive stress value based on the measured stress optical coefficient (SOC). The FSM instrument couples light into and out of the glass surface which has a higher refractive index than air. The measured birefringence is then related to stress through a material constant, the stress-optic or photoelastic coefficient (SOC or PEC), and two parameters are obtained: the maximum surface compressive stress (CS) and the exchanged depth of layer (DOL). The diffusivity of the alkali ions in the glass and the change in stress per square root of time may also be determined. The diffusivity (D) of the glass is calculated from the measured depth of layer (DOL) and the ion exchange time (t) according to the relationship: DOL=~1.4*sqrt(4*D*t). Diffusivity increases with temperature according to an Arrhenius relationship, and, as such, it is reported at a specific temperature.

Glass is a preferred material for pharmaceutical packaging for several reasons, including optical clarity, hermeticity, and chemical inertness. However, it is possible for a glass package to exhibit a crack which can destroy the hermeticity of the glass package (and, in turn, the sterility of the contents of the glass package) without compromising the ability of the glass package to hold and retain its contents. That is, the glass package and its contents remain intact despite the hermeticity of the glass package being compromised by the crack.

For example, FIG. 1 is a photograph of the bottom of a glass pharmaceutical package, specifically a glass vial. As shown in the photograph, the glass pharmaceutical package includes a crack which extends across the diameter of the bottom of the pharmaceutical package. The presence of the crack compromised the hermeticity of the glass pharmaceutical package. However, despite the presence of the crack, the package itself remained intact and able to retain its contents. That is, the crack did not result in the catastrophic failure of the glass pharmaceutical package and the corresponding release of its contents, presenting a risk that the contents of the package may be used despite the hermeticity of the glass pharmaceutical package being compromised.

One way to prevent the use of the contents of a glass pharmaceutical package when a crack has compromised the hermeticity of the package is to ensure that the glass pharmaceutical package catastrophically fails upon the formation of the crack. This phenomenon is referred to as "self-elimination" of the glass package. Self-elimination of the glass package can be achieved by strengthening the glass package such that the surfaces of the wall(s) of the glass container are under a compressive stress which extends into the thickness of the wall to a depth of layer DOL, thereby creating a compressive region in the glass. The compressive stress may be formed in the glass package by, for example, chemically strengthening the glass by ion exchange, thermally tempering the glass, and/or laminating the glass. The introduction of the compressive stress in the wall(s) of the glass package is accompanied by the corresponding development of a central tension CT in a central region of the wall (i.e., a region located in the thickness of the glass between the surfaces of the wall(s)). The central tension balances the compressive stress.

When a flaw forms in the surface of the glass but does not extend through the depth of layer of the compressive stress, the compressive stress in the wall(s) of the glass prevents the flaw from further propagating absent the introduction of external energy sufficient to overcome the compressive stress.

However, when the central tension is greater than a threshold central tension sufficient for self-elimination of the glass package and the flaw front of a flaw extends through the depth of layer of the compressive stress and into the central tension, the central tension may cause the flaw to further propagate through the glass, including potential bifurcation of the flaw (also referred to as multiple branching), resulting in the glass package being fractured into multiple pieces. This type of fracturing makes a breach in the container more readily detectable by existing CCI-detecting methods such as high voltage leak detection, headspace analysis, or the like. In some embodiments, this type of fracturing effectively destroys the glass package and causes the release of the contents of the glass package, thereby ensuring that the contents of the glass package cannot be used when the hermeticity of the package is compromised.

Thus, the introduction of a compressive stress in the glass package can, on the one hand, strengthen the glass package and improve the resistance of the glass package to failure due to mechanical insult. On the other hand, the introduction of compressive stress in the glass package, when accompanied by a corresponding central tension which exceeds the threshold central tension sufficient for self-elimination, ensures the self-elimination of the glass package under conditions in which flaws or mechanical insults extend through the depth of layer of the compressive stress and into the central tension, which would otherwise compromise the hermeticity of the glass package without eliminating the glass package absent the presence of the threshold central tension sufficient for self-elimination.

It has now been determined that the threshold central tension sufficient for self-elimination is as low as 13 MPa (i.e., the threshold central tension is greater than or equal to 13 MPa). That is, when the central tension in the glass package is greater than or equal to 13 MPa and a flaw or mechanical insult extends through the depth of layer of the compressive stress and into the central tension, the central tension propagates the flaw or mechanical insult resulting in the catastrophic failure of the glass package. This value of the threshold central tension was determined for glass containers having a wall thickness of 1.1 millimeters (mm). While it was hypothesized that this value will have some dependence on wall thickness, the data of the present application indicates that the threshold central tension does not have a strong dependence on wall thickness.

Figure 2:
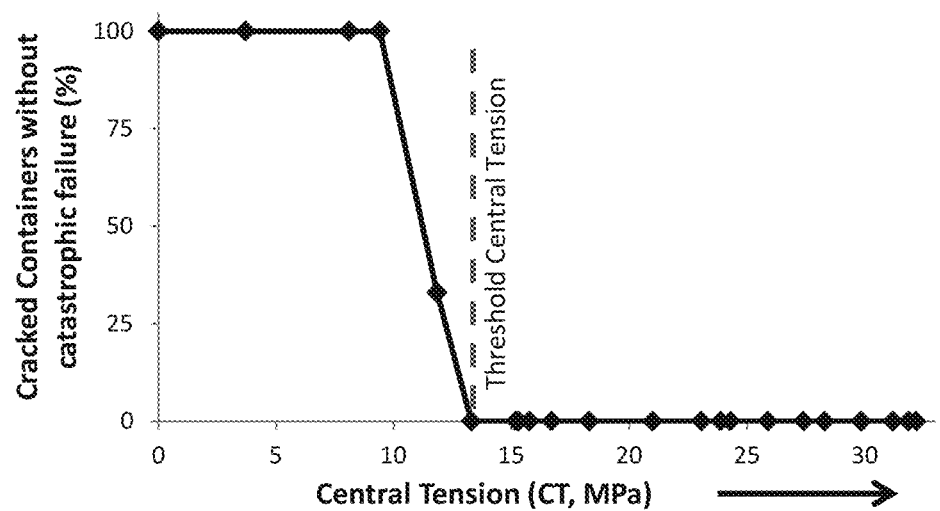
FIG. 2 graphically depicts the percentage of containers with cracks without catastrophic failure (y-ordinate) as a function of central tension (x-ordinate)

For example, FIG. 2 graphically depicts the percentage of containers with cracks without catastrophic failure (y-ordinate) as a function of central tension (x-ordinate). The containers had a wall thickness of 1.1 mm. As depicted in FIG. 2, there is a possibility that glass packages which have a central tension less than 13 MPa will withstand the formation of cracks without catastrophic failure of the glass package. Under these conditions, the crack effectively compromises the hermeticity of the glass package without destroying the glass package as the cracks are essentially stable absent the introduction of external energy to propagate the cracks.

However, as indicated in FIG. 2, glass packages which have a central tension greater than or equal to 13 MPa fail catastrophically (i.e., are self-eliminated) when a flaw or other mechanical insult extends into the central tension.

Glass pharmaceutical packages that are classified as Type I containers under United States Pharmacopoeia (USP) <660> are generally formed from borosilicate glasses. According to USP <660>, containers classified as Type I containers have a high hydrolytic resistance making them suitable for containing most parenteral and nonparenteral compositions. However, it has now been determined that Type I borosilicate glass compositions (as described in ASTM E438) currently used for glass pharmaceutical packages are incapable of being strengthened to achieve a central tension of greater than or equal to 13 MPa. As such, the glass pharmaceutical packages formed from such glass compositions are susceptible to the formation of cracks which compromise the hermeticity of the glass package but do not result in self-elimination of the glass package.

Figure 3:
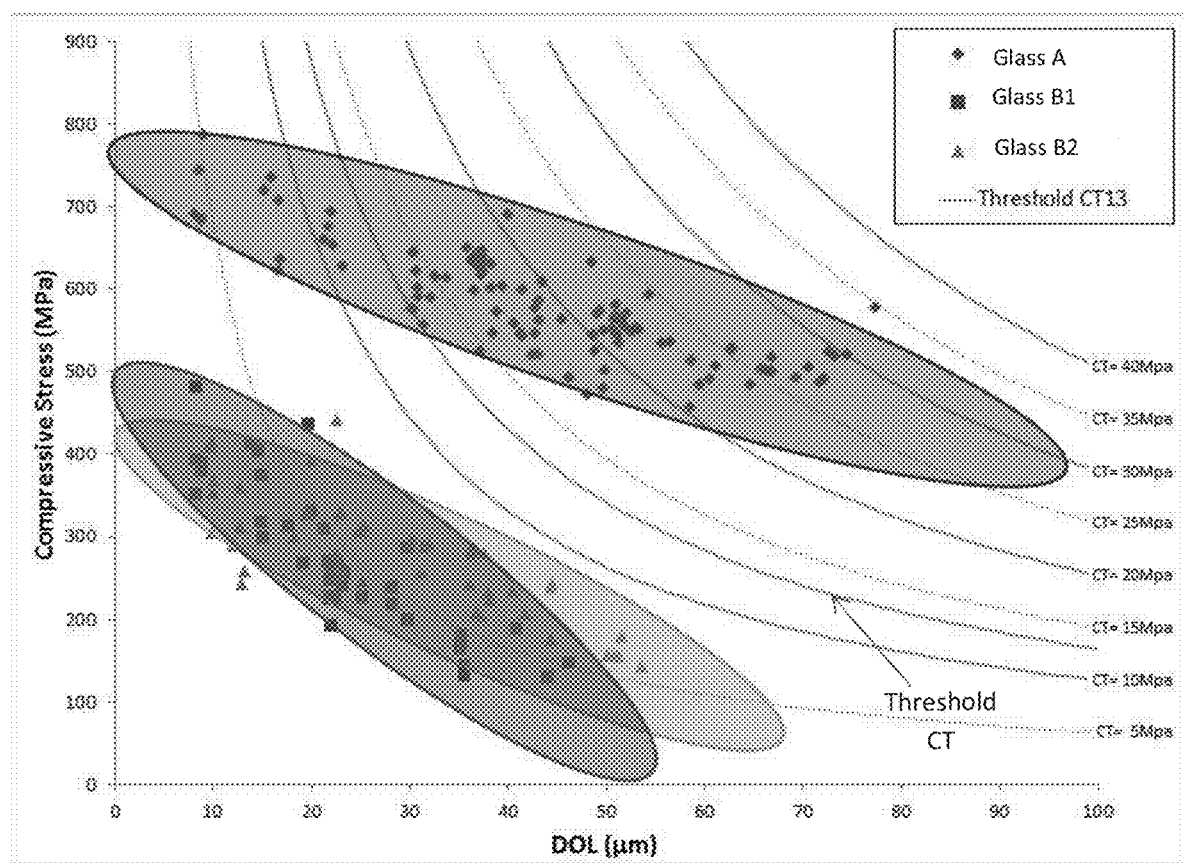
FIG. 3 graphically depicts the compressive stress (y-ordinate), central tension (contour lines), and depth of layer (x-ordinate) for a prior art aluminosilicate glass composition and two prior art borosilicate glass compositions at nominally 1 mm (or 1.1 mm) wall thickness.

For example, FIG. 3 graphically depicts the compressive stress (y-ordinate), central tension (contour lines), and depth of layer (x-ordinate) for a prior art aluminosilicate glass composition and two prior art borosilicate glass compositions. The glass identified as "Glass A" was Corning glass code 2345, a prior art aluminosilicate glass composition which is free of boron and compounds containing boron. The glass identified as "Glass B1" was a commercially available borosilicate glass composition used for glass pharmaceutical packages having the following composition in mol. %: 77.9 $SiO_2$; 3.4 $Al_2O_3$; 9.8$B_2O_3$; 7.0 $Na_2O$; 0.1 $K_2O$; 0.1 MgO; 1.7 CaO; and 0.1 $As_2O_5$. The glass identified as "Glass B2" was a commercially available borosilicate glass composition used for glass pharmaceutical packages having the following composition in mol. %: 76.0 $SiO_2$; 4.2 $Al_2O_3$; 10.5$B_2O_3$; 6.6 $Na_2O$; 1.6 $K_2O$; 0.5 MgO; 0.6 CaO; and 0.1 Cl$^-$. Samples of the glass compositions were ion exchanged in a molten salt bath comprising 100% $KNO_3$ at temperatures from about 410° C. to about 500° C. for 0.2 hours up to about 88 hours. Following ion exchange strengthening, the compressive stress and DOL were determined as described herein. The central tension (CT) was calculated as a function of DOL, compressive stress (CS), and wall thickness t. Specifically:

$$CT = CS * \frac{DOL * \frac{2}{1.4\sqrt{\pi}}}{t - DOL * \frac{2}{1.4\sqrt{\pi}}}$$

Still referring to FIG. 3, it was determined for Glass A, Glass B1, and Glass B2 that the DOL increased with increasing ion exchange time and/or ion exchange temperature while the compressive stress decreased with increasing ion exchange time and/or ion exchange temperature. With reference to Glass A, the data indicates that the central tension increased with increasing ion exchange time and/or ion exchange temperature and that a central tension greater than or equal to 13 MPa was readily achievable through ion exchange.

However, with respect to Glass B1 and Glass B2, the commercially available borosilicate glass compositions, only a slight increase in the central tension was observed with increasing ion exchange time and/or ion exchange temperature. Based on this data it was also determined that neither Glass B1 nor Glass B2 would be able to reach a central tension of 13 MPa regardless of the ion exchange time and/or ion exchange temperature. As such, the glass pharmaceutical packages formed from these commercially available glass compositions may be susceptible to the formation of cracks which compromise the hermeticity of the glass package but do not result in self-elimination of the glass package.

The glass compositions described herein address the deficiencies of the borosilicate glass compositions identified above. Specifically, described herein are borosilicate glass compositions susceptible to strengthening by ion exchange and capable of achieving a central tension of greater than or equal to 13 MPa. The borosilicate glass compositions described herein may also be suitable for use as pharmaceutical packages. As such, glass pharmaceutical packages formed from the borosilicate glass compositions described herein are capable of self-elimination when the hermeticity of the glass pharmaceutical package is compromised.

It has been determined that, for borosilicate glass compositions and glass articles formed therefrom, the relationship between the concentrations (mol. %) of certain constituent components influences the ion exchange performance of the glass composition and, in turn, the magnitude of central tension that can be achieved in the glass upon ion exchange strengthening.

In particular, it has now been determined that the relationship between the concentrations (mol. %) of certain constituent components of a borosilicate glass composition, specifically $B_2O_3$, $Na_2O$, and MgO, may be used to determine the magnitude of central tension that may be achieved in a borosilicate glass upon ion exchange strengthening. Specifically, it has been determined that the central tension achievable in a glass article formed from the borosilicate glass compositions can be expressed as:

$$CT = 0.0308543*(188.5 + 423.84*Al_2O_3) + (-16.97*B_2O_3) + (69.10*Na_2O) + (-213.3*K_2O)) + ((Na_2O - 7.274)^2*(-7.3628) + (Al_2O_3 - 2.863)*(K_2O - 0.520)*(321.5) + (B_2O_3 - 9.668)*(K_2O - 0.520)*(-39.74)))/t \quad \text{Equation 1:}$$

where CT is the central tension, $Al_2O_3$ is the concentration (mol. %) of $Al_2O_3$ in the glass composition, $B_2O_3$ is the concentration (mol. %) of $B_2O_3$ in the glass composition, $Na_2O$ is the concentration (mol. %) of $Na_2O$ in the glass composition, $K_2O$ is the concentration (mol. %) of $K_2O$ in the glass composition, and t is the thickness of the glass. For example, when the glass composition is formed into a glass article, such as a glass plate, t is the thickness of the glass plate; when the glass composition is formed into a glass pharmaceutical package, such as a glass vial, t is the nominal thickness of the glass article at the location of measurement. These central tension values are obtainable within 24 hours of ion exchange time, such as less than or equal to 12 hours of exchange time or even less than or equal to 6 hours of exchange time.

As noted hereinabove, when the glass composition is formed into a glass article, such as a glass pharmaceutical package, and the central tension in the sidewall of the glass pharmaceutical package is greater than or equal to 13 MPa (i.e., when CT≥13 MPa), the glass pharmaceutical package self-eliminates when the hermeticity of the glass pharmaceutical package is compromised by the development of a flaw that extends into the central tension causing self-elimination of the package, which flaw would have produced a crack but for the central tension.

While Equation 1 includes terms related to the concentration of $Al_2O_3$, $B_2O_3$, $K_2O$ and $Na_2O$ in the glass, it should be understood that the borosilicate glass compositions characterized by Equation 1 may include other constituent components including, without limitation, $SiO_2$, other alkali oxides, other alkaline earth oxides, and the like. Further, while Equation 1 includes terms related to the concentration of $Al_2O_3$, $B_2O_3$, $K_2O$ and $Na_2O$, it should be understood that Equation 1 can also be used to estimate the central tension obtainable in borosilicate glasses which do not include $Al_2O_3$ and/or $K_2O$.

The glass compositions described herein are borosilicate glass compositions capable of being ion exchange strengthened such that, after ion exchange strengthening, the glass has a central tension of greater than or equal to 13 MPa and the glass compositions are capable of self-elimination when used, for example, as glass pharmaceutical packages. Accordingly, for the glass compositions described herein, the CT, as defined by Equation 1, is greater than or equal to 13 MPa.

The glass compositions described herein generally include a combination of $SiO_2$, $B_2O_3$, and at least one alkali oxide, such as $Na_2O$ and/or $K_2O$. The glass composition may also include $Al_2O_3$ and/or at least one alkaline earth oxide. The glass compositions may be resistant to chemical degradation and are also suitable for chemical strengthening by ion exchange. In some embodiments the glass compositions may further comprise one or more additional oxides such as, for example, $SnO_2$, $Fe_2O_3$, $ZrO_2$, $TiO_2$, $As_2O_3$ or the like. These components may be added as fining agents and/or to further enhance the chemical durability of the glass composition. In some embodiments, the glass compositions may also include Cl, F, and/or Br which may be added to the glass as fining agents.

In the embodiments of the glass compositions described herein $SiO_2$ is the largest constituent of the composition and, as such, $SiO_2$ is the primary constituent of the resulting glass network. $SiO_2$ enhances the chemical durability of the glass and, in particular, the resistance of the glass composition to decomposition in acid and the resistance of the glass composition to decomposition in water. Accordingly, a high $SiO_2$ concentration is generally desired. However, if the content of $SiO_2$ is too high, the formability of the glass may be diminished as higher concentrations of $SiO_2$ increase the difficulty of melting the glass which, in turn, adversely impacts the formability of the glass. In the embodiments described herein, the glass composition generally comprises greater than or equal to 70 mol. % $SiO_2$, such as greater than or equal to about 72 mol. % $SiO_2$ or even greater than or equal to about 74 mol. % $SiO_2$. For example, in some embodiments the glass composition comprises $SiO_2$ in an amount greater than or equal to 72 mol. % and less than or equal to about 82 mol. %, less than or equal to 81 mol. %, or even less than or equal to 80 mol. %. In some of these embodiments, the amount of $SiO_2$ in the glass composition may be greater than or equal to about 72.5 mol. %, greater than or equal to about 73 mol. %, greater than or equal to about 74 mol. %, or even greater than or equal to 75 mol. %. In some other embodiments, the glass composition may include greater than or equal to about 73 mol. % and less than or equal to about 80 mol. % or even less than or equal to about 78 mol. % $SiO_2$.

The glass compositions described herein may further include $Al_2O_3$. $Al_2O_3$, in conjunction with alkali oxides present in the glass compositions such as $Na_2O$ or the like, improves the susceptibility of the glass to ion exchange strengthening. However, if the amount of $Al_2O_3$ in the glass composition is too high, the resistance of the glass composition to acid attack is diminished. Accordingly, the glass compositions described herein generally include $Al_2O_3$ in an amount greater than or equal to about 1 mol. %. In embodiments, the glass composition may include $Al_2O_3$ in an amount greater than or equal to about 1 mol. % and less than or equal to about 6 mol. %. In some embodiments, the amount of $Al_2O_3$ in the glass composition is greater than or equal to about 1 mol. % and less than or equal to about 5 mol. % or even less than or equal to 4.5 mol. %. In some other embodiments, the amount of $Al_2O_3$ in the glass composition is greater than or equal to about 2 mol. % to less than or equal to about 6 mol. %. In some other embodiments, the amount of $Al_2O_3$ in the glass composition is greater than or equal to about 3 mol. % to less than or equal to about 6 mol. %. In still other embodiments, the amount of $Al_2O_3$ in the glass composition is greater than or equal to about 3 mol. % to less than or equal to about 5 mol. %. In general, as the concentration of $Al_2O_3$ in the glass increases, the central tension (CT) in the glass also increases.

Boron oxide ($B_2O_3$) is a flux which may be added to glass compositions to reduce the viscosity at a given temperature (e.g., the strain, anneal and softening temperatures) thereby improving the formability of the glass. In the embodiments described herein, the concentration of $B_2O_3$ in the glass composition is generally greater than or equal to about 3 mol. %. For example, in embodiments the concentration of $B_2O_3$ may be greater than or equal to about 3 mol. % and less than or equal to about 16 mol. %. In some of these embodiments, the concentration of $B_2O_3$ may be greater than or equal to about 4 mol. % and less than or equal to about 12 mol. %, less than or equal to about 11 mol. %, or even less than or equal to 10.5 mol. %. In some of these embodiments, the $B_2O_3$ may be present in an amount greater than or equal to about 5 mol. % and less than or equal to about 12 mol. %, or even less than or equal to about 11 mol. %.

In embodiments the difference between the total alkali oxide concentration ($R_2O$, where R is K, Li, and Na) in mol. % and the $Al_2O_3$ concentration in mol. % divided by the total $B_2O_3$ concentration in mol. % (i.e., ($R_2O-Al_2O_3)/B_2O_3$) is greater than or equal to 0.7 or even greater than or equal to 1.0. It has been found that, when this value is at least 0.7, the central tension in the glass after ion exchange is sufficient for self-elimination.

In embodiments, the glass compositions also include one or more alkali oxides such as $Na_2O$ and/or $K_2O$. The alkali oxides facilitate the ion exchangeability of the glass composition and, as such, facilitate chemically strengthening the glass. In the embodiments of the glass compositions described herein, the glass compositions include greater than or equal to about 6 mol. % and less than or equal to about 12 mol. % alkali oxide. In some of these embodiments, the glass compositions include greater than or equal to about 6 mol. % and less than or equal to about 11 mol. % alkali oxide. In some of these embodiments, the glass compositions may include greater than or equal to about 9 mol. % and less than or equal to about 11 mol. % alkali oxide or, alternatively, greater than or equal to about 6 mol. % and less than or equal to about 9 mol. % alkali oxide.

The ion exchangeability of the glass composition is primarily imparted to the glass composition by the amount of the alkali oxide $Na_2O$ initially present in the glass composition prior to ion exchange. Accordingly, in the embodiments of the glass compositions described herein, the alkali oxide present in the glass composition includes at least $Na_2O$. Specifically, in order to achieve the desired compressive stress and depth of layer in the glass composition upon ion exchange strengthening, the glass compositions include $Na_2O$ in an amount greater than or equal to about 5 mol. % and less than or equal to about 12 mol. %. In some embodiments the glass composition includes greater than or equal to about 8 mol. % of $Na_2O$ and less than or equal to about 11 mol. % $Na_2O$. In some other embodiments, the concentration of $Na_2O$ may be greater than or equal to about 5 mol. % and less than or equal to about 10 mol. %. In yet other embodiments, the concentration of $Na_2O$ may be greater than or equal to about 6 mol. % and less than or equal to about 9.5 mol. %.

As noted above, the alkali oxide in the glass composition may further include $K_2O$. The amount of $K_2O$ present in the glass composition also relates to the ion exchangeability of the glass composition. Specifically, as the amount of $K_2O$ present in the glass composition increases, the diffusion rate increases improving the rate of the ion exchange process, but the compressive stress obtainable through ion exchange decreases as a result of the exchange of potassium and sodium ions. Accordingly, it is desirable to limit the amount of $K_2O$ present in the glass composition. In some embodiments, the amount of $K_2O$ is greater than or equal to about 0.1 mol. % or even greater than or equal to about 0.3 mol. % and less than or equal to about 2.5 mol. %. In some of these embodiments, the amount of $K_2O$ is less than or equal to about 2 mol. % or even less than or equal to about 1.5 mol. %. In some embodiments, the $K_2O$ may be present in a concentration greater than or equal to about 0.3 mol. % and less than or equal to about 1.0 mol. %.

Alkaline earth oxides may be present in the composition to improve the meltability of the glass batch materials and increase the chemical durability of the glass composition. In the glass compositions described herein, the total mol. % of alkaline earth oxides present in the glass compositions is generally less than the total mol. % of alkali oxides present in the glass compositions in order to improve the ion exchangeability of the glass composition. In the embodiments described herein, the glass compositions generally include greater than or equal to about 0 mol. % and less than or equal to about 10 mol. % of alkaline earth oxide. In some of these embodiments, the amount of alkaline earth oxide in the glass composition may be greater than or equal to about 0 mol. % and less than or equal to about 5 mol. % or even greater than or equal to about 0 mol. % and less than or equal to about 3 mol. %.

The alkaline earth oxide in the glass composition may include MgO, CaO, BaO or combinations thereof. In some embodiments, the glass composition includes both MgO and CaO. In these embodiments, the total concentration of CaO and MgO may be greater than or equal to 0.15 mol. % and less than or equal to 10 mol. %.

In the embodiments described herein the alkaline earth oxide includes MgO. MgO is present in the glass composition in an amount which is greater than or equal to about 0.1 mol. % and less than or equal to about 6 mol. %. In some embodiments, MgO may be present in the glass composition in an amount which is greater than or equal to about 0.15 mol. % and less than or equal to about 6 mol. %. In some of these embodiments, MgO may be present in the glass composition in an amount greater than or equal to about 0.15 mol. % and less than or equal to about 5 mol. %, greater than or equal to about 0.15 mol. % and less than or equal to about 4 mol. %, or even greater than or equal to about 0.2 mol. % and less than or equal to about 4 mol. %.

In some embodiments, the alkaline earth oxide may further include CaO. In these embodiments CaO is present in the glass composition in an amount greater than or equal to 0.1 mol. % or even greater than or equal to 0.15 mol. %. For example, the amount of CaO present in the glass composition may be greater than or equal to about 0.5 mol. % and less than or equal to about 4 mol. %. In some of these embodiments, CaO may be present in the glass composition in an amount greater than or equal to about 0.5 mol. % and less than or equal to about 3.5 mol. % or even greater than or equal to about 0.5 mol. % and less than or equal to about 3 mol. %. In some other embodiments, CaO may be present in the glass composition in an amount greater than or equal to about 0.5 mol. % and less than or equal to about 2.5 mol. % or even in an amount greater than or equal to about 0.5 mol. % and less than or equal to about 2.0 mol. %.

In some embodiments, the alkaline earth oxide may further include BaO. In these embodiments BaO is present in the glass composition in an amount greater than or equal to about 0.0 mol. %. For example, the amount of BaO present in the glass composition may be greater than or equal to about 0.0 mol. % and less than or equal to about 1.5 mol. %. In some of these embodiments, BaO may be present in the glass composition in an amount greater than or equal to about 0.0 mol. % and less than or equal to about 1.0 mol. % or even greater than or equal to about 0.5 mol. % and less than or equal to about 1.0 mol. %. In some other embodiments, BaO may be present in the glass composition in an amount greater than or equal to about 0.5 mol. % and less than or equal to about 0.75 mol. %.

In addition to the $SiO_2$, $Al_2O_3$, $B_2O_3$, alkali oxides and alkaline earth oxides, the glass compositions described herein may optionally further comprise one or more fining agents such as, for example, $SnO_2$, $As_2O_3$, $F^-$, $Br^-$, and/or $Cl^-$ (from NaCl or the like). When a fining agent is present in the glass composition, the fining agent may be present in an amount less than or equal to about 1 mol. % or even less than or equal to about 0.4 mol. %. For example, in some embodiments the glass composition may include $SnO_2$ as a fining agent. In these embodiments $SnO_2$ may be present in the glass composition in an amount greater than about 0 mol. % and less than or equal to about 1 mol. % or even an amount greater than or equal to about 0.01 mol. % and less than or equal to about 0.30 mol. %. In other embodiments, the fining agent may include $Cl^-$. In these embodiments $Cl^-$ may be present in the glass composition in an amount greater than about 0 mol. % and less than or equal to about 0.5 mol. % or even an amount greater than or equal to about 0.01 mol. % and less than or equal to about 0.30 mol. %.

Moreover, the glass compositions described herein may comprise one or more additional metal oxides to further improve the chemical durability of the glass composition. For example, the glass composition may further include $TiO_2$, or $ZrO_2$, each of which further improves the resistance of the glass composition to chemical attack. In these embodiments, the additional metal oxide may be present in an amount which is greater than or equal to about 0 mol. % and less than or equal to about 2 mol. %. In some of these embodiments, the $ZrO_2$ or $TiO_2$ may be present in an amount less than or equal to about 1 mol. %.

It should be understood that various embodiments of borosilicate glass compositions are contemplated and possible, including borosilicate glass compositions having various concentration ranges of the aforementioned constituent components. Accordingly, it should be understood that any range of an oxide constituent component described herein may be combined with any other range of one or more other oxide constituent components to arrive at a borosilicate glass composition having the desired characteristics.

In particular embodiments a borosilicate glass composition may comprise, for example and without limitation, greater than or equal to 72 mol. % and less than or equal to 82 mol. % $SiO_2$; greater than or equal to 1 mol. % and less than or equal to 6 mol. % $Al_2O_3$; greater than or equal to 3 mol. % and less than or equal to 16 mol. % $B_2O_3$; greater than or equal to 5 mol. % and less than or equal to 12 mol. % $Na_2O$; greater than or equal to 0.30 mol. % and less than or equal to 1.5 mol. % $K_2O$; greater than or equal to 0.10 mol. % and less than or equal to 6.00 mol. % MgO; and greater than or equal to 0 mol. % or even greater than or equal to 0.5 mol. % and less than or equal to 4.0 mol. % CaO.

In some of those embodiments, the glass composition may comprise greater than or equal to 73 mol. % and less than or equal to 80 mol. % $SiO_2$; greater than or equal to 1 mol. % and less than or equal to 6 mol. % $Al_2O_3$; greater than or equal to 4 mol. % and less than or equal to 11 mol. % $B_2O_3$; greater than or equal to 5 mol. % and less than or equal to 12 mol. % $Na_2O$; greater than or equal to 0.30 mol. % and less than or equal to 1.5 mol. % $K_2O$; greater than or equal to 0.15 mol. % and less than or equal to 6.00 mol. % MgO; and greater than or equal to 0 mol. % or even greater than or equal to 0.5 mol. % and less than or equal to 4.0 mol. % CaO.

In still further embodiments, the glass composition may comprise greater than or equal to 73 mol. % and less than or equal to 75 mol. % $SiO_2$; greater than or equal to 3 mol. % and less than or equal to 6 mol. % $Al_2O_3$; greater than or equal to 5 mol. % and less than or equal to 10 mol. % $B_2O_3$; greater than or equal to 8 mol. % and less than or equal to 11 mol. % $Na_2O$; greater than or equal to 0.30 mol. % and less than or equal to 1.5 mol. % $K_2O$; greater than or equal to 0.15 mol. % and less than or equal to 4.00 mol. % MgO;

and greater than or equal to 0 mol. % or even greater than or equal to 0.5 mol. % and less than or equal to 4.0 mol. % CaO.

In yet further embodiments, the glass composition may comprise greater than or equal to 73 mol. % and less than or equal to 80 mol. % $SiO_2$; greater than or equal to 1 mol. % and less than or equal to 5 mol. % $Al_2O_3$; greater than or equal to 4 mol. % and less than or equal to 11 mol. % $B_2O_3$; greater than or equal to 5 mol. % and less than or equal to 10 mol. % $Na_2O$; greater than or equal to 0.30 mol. % and less than or equal to 1.0 mol. % $K_2O$; greater than or equal to 0.15 mol. % and less than or equal to 6.00 mol. % MgO; and greater than or equal to 0 mol. % or even greater than or equal to 0.5 mol. % and less than or equal to 4.0 mol. % CaO.

In yet further embodiments, the glass composition may comprise greater than or equal to 74 mol. % and less than or equal to 81 mol. % $SiO_2$; greater than or equal to 1 mol. % and less than or equal to 4.5 mol. % $Al_2O_3$; greater than or equal to 4 mol. % and less than or equal to 10.5 mol. % $B_2O_3$; greater than or equal to 6 mol. % and less than or equal to 9.5 mol. % $Na_2O$; greater than or equal to 0.10 mol. % and less than or equal to 1.5 mol. % $K_2O$; greater than or equal to 0.2 mol. % and less than or equal to 4.00 mol. % MgO; and greater than or equal to 0 mol. % or even greater than or equal to 0.5 mol. % and less than or equal to 4.0 mol. % CaO.

As noted above, the presence of alkali oxides in the glass composition facilitates chemically strengthening the glass by ion exchange. Specifically, alkali ions, such as potassium ions, sodium ions and the like, are sufficiently mobile in the glass to facilitate ion exchange. As noted herein, after strengthening, the glass has a central tension that is greater than or equal to 13 MPa which facilitates self-elimination when flaws and/or other mechanical insults penetrate through the depth of layer of the compressive stress and into the central tension. In some embodiments, the glass composition is ion exchangeable to form a compressive stress layer having a depth of layer greater than or equal to 10 μm. In some embodiments, the depth of layer may be greater than or equal to about 25 μm or even greater than or equal to about 50 μm. In some other embodiments, the depth of the layer may be greater than or equal to 60 μm or even greater than or equal to 65 μm. In still other embodiments, the depth of layer may be greater than or equal to 10 μm and less than or equal to about 100 μm or even greater than or equal to 15 μm and less than or equal to 70 μm. The associated surface compressive stress may be greater than or equal to about 200 MPa greater, than or equal to about 250 MPa, greater than or equal to about 300 MPa or even greater than or equal to about 350 MPa after the glass composition is treated in a salt bath of 100% molten $KNO_3$ at a temperature of 350° C. to 500° C. for a time period of less than about 30 hours or even about less than 20 hours.

Further, in embodiments, the glass compositions described herein may be chemically durable and resistant to degradation as determined by one or more of the DIN 12116 standard, the ISO 695 standard, and the ISO 720 standard.

Specifically, the DIN 12116 standard is a measure of the resistance of the glass to decomposition when placed in an acidic solution. In brief, the DIN 12116 standard utilizes a polished or melt-formed glass sample of a known surface area which is weighed and then positioned in contact with a proportional amount of boiling 6M hydrochloric acid for 6 hours. The sample is then removed from the solution, dried and weighed again. The glass mass lost during exposure to the acidic solution is a measure of the acid durability of the sample with smaller numbers indicative of greater durability. The results of the test are reported in units of half-mass per surface area, specifically $mg/dm^2$. The DIN 12116 standard is broken into individual classes. Class S1 indicates weight losses of up to 0.7 $mg/dm^2$; Class S2 indicates weight losses from 0.7 $mg/dm^2$ up to 1.5 $mg/dm^2$; Class S3 indicates weight losses from 1.5 $mg/dm^2$ up to 15 $mg/dm^2$; and Class S4 indicates weight losses of more than 15 $mg/dm^2$.

It has been determined that, for borosilicate glass compositions and glass articles formed therefrom, the relationship between the concentrations (mol. %) of certain constituent components influences the resistance of the glass to degradation in acidic solutions. In particular, it has now been determined that the relationship between the concentrations (mol. %) of certain constituent components of a borosilicate glass composition, specifically Sift, $Al_2O_3$, $B_2O_3$, $K_2O$, and MgO, may be used to determine the resistance of the glass to degradation in acidic solutions. Specifically, it has been determined that the acid resistance of the borosilicate glass compositions can be expressed as:

$$AR=225.3+((-2.237*SiO_2)+(-1.935*Al_2O_3)+(-2.577*B_2O_3)+(-2.032*Na_2O)+(-10.52*K_2O)+(-2.600*MgO)+(-1.2308*BaO))+((Al_2O_3-2.892)^2*(-0.1001)+(B_2O_3-9.623)^2*(-0.2122)+(Al_2O_3-2.892)*(Na_2O-7.153)*(-0.08707)+(Al_2O_3-2.892)*(K_2O-0.5214)*(6.898)+(Na_2O-7.153)*(K_2O-0.5214)*(3.7587))$$

Equation 2:

where AR is the acid resistance of the glass, $SiO_2$ is the concentration (mol. %) of $SiO_2$ in the glass composition, $Al_2O_3$ is the concentration (mol. %) of $Al_2O_3$ in the glass composition, $B_2O_3$ is the concentration (mol. %) of $B_2O_3$ in the glass composition, $Na_2O$ is the concentration (mol. %) of $Na_2O$ in the glass composition, $K_2O$ is the concentration (mol. %) of $K_2O$ in the glass composition, BaO is the concentration (mol. %) of BaO in the glass composition, and MgO is the concentration (mol. %) of MgO in the glass composition.

When the glass composition has an AR value of less than 1.5 (i.e., AR<1.5) as calculated per Equation 2, a glass article formed from the glass composition will have an acid resistance of Class S1 or Class S2 according to DIN 12116.

While Equation 2 includes terms related to the concentration of $SiO_2$, $Al_2O_3$, $B_2O_3$, $K_2O$, $Na_2O$, BaO, and MgO in the glass, it should be understood that the borosilicate glass compositions characterized by Equation 2 may include other constituent components including, without limitation, other alkali oxides, other alkaline earth oxides, and the like. Further, while Equation 2 includes terms related to the concentration of $SiO_2$, $Al_2O_3$, $B_2O_3$, $K_2O$, $Na_2O$, BaO and MgO, it should be understood that the Equation 2 can also be used to characterize the acid resistance of borosilicate glasses which do not include $Al_2O_3$, $K_2O$, BaO, and/or MgO.

The ISO 695 standard is a measure of the resistance of the glass to decomposition when placed in a basic solution. In brief, the ISO 695 standard utilizes a polished glass sample which is weighed and then placed in a solution of boiling 1M NaOH+0.5M $Na_2CO_3$ for 3 hours. The sample is then removed from the solution, dried and weighed again. The glass mass lost during exposure to the basic solution is a measure of the base durability of the sample with smaller numbers indicative of greater durability. As with the DIN 12116 standard, the results of the ISO 695 standard are reported in units of mass per surface area, specifically $mg/dm^2$. The ISO 695 standard is broken into individual classes. Class A1 indicates weight losses of up to 75 mg/dm$^2$; Class A2 indicates weight losses from 75 mg/dm$^2$ up to 175 mg/dm$^2$; and Class A3 indicates weight losses of more than 175 mg/dm$^2$.

It has been determined that, for borosilicate glass compositions and glass articles formed therefrom, the relationship between the concentrations (mol. %) of certain constituent components influences the resistance of the glass to degradation in basic solutions. In particular, it has now been determined that the relationship between the concentrations (mol. %) of certain constituent components of a borosilicate glass composition, specifically $SiO_2$, $Al_2O_3$, $B_2O_3$, $Na_2O$, $K_2O$, and MgO, may be used to determine the resistance of the glass to degradation in basic solutions. Specifically, it has been determined that the base resistance of the borosilicate glass compositions can be expressed as:

$$BR=-91.26+((1.049*SiO_2)+(-8.270*Al_2O_3)+(-10.18*B_2O_3)+(4.745*Na_2O)+(-3.051*MgO)+(SiO_2-77.59)^2*(-0.8365)+(Al_2O_3-2.912)*(B_2O_3-9.617)*(1.649)+(Al_2O_3-2.912)*(Na_2O-7.294)*(3.573)+(B_2O_3-9.617)*(Na_2O-7.294)*(2.789)+(Na_2O-7.294)*(MgO-0.6991)*(2.294)) \quad \text{Equation 3:}$$

where BR is the base resistance of the glass, $SiO_2$ is the concentration (mol. %) of $SiO_2$ in the glass composition, $Al_2O_3$ is the concentration (mol. %) of $Al_2O_3$ in the glass composition, $B_2O_3$ is the concentration (mol. %) of $B_2O_3$ in the glass composition, $Na_2O$ is the concentration (mol. %) of $Na_2O$ in the glass composition, and MgO is the concentration (mol. %) of MgO in the glass composition.

When the glass composition has a BR value of less than 175 (i.e., BR<175) as calculated per Equation 3, a glass article formed from the glass composition will have a base resistance of Class A1 or Class A2 according to ISO 695.

While Equation 3 includes terms related to the concentration of $SiO_2$, $Al_2O_3$, $B_2O_3$, $Na_2O$, and MgO in the glass, it should be understood that the borosilicate glass compositions characterized by Equation 3 may include other constituent components including, without limitation, other alkali oxides, other alkaline earth oxides, and the like. Further, while Equation 3 includes terms related to the concentration of $SiO_2$, $Al_2O_3$, $B_2O_3$, $Na_2O$ and MgO, it should be understood that the Equation 3 can also be used to characterize the acid resistance of borosilicate glasses which do not include $Al_2O_3$, $Na_2O$, $K_2O$, and/or MgO.

The ISO 720 standard is a measure of the resistance of the glass to degradation in purified, $CO_2$-free water. In brief, the ISO 720 standard protocol utilizes crushed glass grains which are placed in contact with the purified, $CO_2$-free water under autoclave conditions (121° C., 2 atm) for 30 minutes. The solution is then titrated colorimetrically with dilute HCl to neutral pH. The amount of HCl required to titrate to a neutral solution is then converted to an equivalent of $Na_2O$ extracted from the glass and reported in μg $Na_2O$ per weight of glass with smaller values indicative of greater durability. The ISO 720 standard is broken into individual types. Type HGA1 is indicative of up to 62 μg extracted equivalent of $Na_2O$ per gram of glass tested; Type HGA2 is indicative of more than 62 μg and up to 527 μg extracted equivalent of $Na_2O$ per gram of glass tested; and Type HGA3 is indicative of more than 527 μg and up to 930 μg extracted equivalent of $Na_2O$ per gram of glass tested.

It has been determined that, for borosilicate glass compositions and glass articles formed therefrom, the relationship between the concentrations (mol. %) of certain constituent components influences the resistance of the glass to degradation in water. In particular, it has now been determined that the relationship between the concentrations (mol. %) of certain constituent components of a borosilicate glass composition, specifically $SiO_2$, $Al_2O_3$, $B_2O_3$, $Na_2O$, $K_2O$, CaO, and MgO, may be used to determine the resistance of the glass to degradation in water (i.e., the hydrolytic resistance of the glass). Specifically, it has been determined that the hydrolytic resistance of the borosilicate glass compositions can be expressed as:

$$HR=-0.5963+((-0.1996*Al_2O_3)+(0.06393*B_2O_3)+(0.9536*K_2O)+(0.1498*CaO))+((Al_2O_3-2.953)^2*(0.03741))+((Al_2O_3-2.953)*(B_2O_3-9.653)*(-0.04407))+((Al_2O_3-2.953)*(K_2O-0.5185)*(-1.547))+((Al_2O_3-2.953)*(CaO-1.078)*(-0.7488)) \quad \text{Equation 4:}$$

where HR is the hydrolytic resistance of the glass, $Al_2O_3$ is the concentration (mol. %) of $Al_2O_3$ in the glass composition, $B_2O_3$ is the concentration (mol. %) of $B_2O_3$ in the glass composition, $K_2O$ is the concentration (mol. %) of $K_2O$ in the glass composition and CaO is the concentration (mol. %) of CaO in the glass composition.

When the glass composition has an HR value of less than or equal to 0.10 (i.e., HR≤0.10) as calculated per Equation 4, a glass article formed from the glass composition will have a hydrolytic resistance of Type HGA1 according to ISO 720.

While Equation 4 includes terms related to the concentration of $Al_2O_3$, $B_2O_3$, $K_2O$ and CaO in the glass, it should be understood that the borosilicate glass compositions characterized by Equation 4 may include other constituent components including, without limitation, other alkali oxides, other alkaline earth oxides, and the like. Further, while Equation 4 includes terms related to the concentration of $Al_2O_3$, $B_2O_3$, $K_2O$ and CaO, it should be understood that the Equation 4 can also be used to characterize the acid resistance of borosilicate glasses which do not include $Al_2O_3$, $K_2O$, and/or CaO.

The ISO 719 standard is a measure of the resistance of the glass to degradation in purified, $CO_2$-free water. In brief, the ISO 719 standard protocol utilizes crushed glass grains which are placed in contact with the purified, $CO_2$-free water at a temperature of 98° C. at 1 atmosphere for 30 minutes. The solution is then titrated colorimetrically with dilute HCl to neutral pH. The amount of HCl required to titrate to a neutral solution is then converted to an equivalent of $Na_2O$ extracted from the glass and reported in μg $Na_2O$ per weight of glass with smaller values indicative of greater durability. The ISO 719 standard is broken into individual types. The ISO 719 standard is broken into individual types. Type HGB1 is indicative of up to 31 μg extracted equivalent of $Na_2O$; Type HGB2 is indicative of more than 31 μg and up to 62 μg extracted equivalent of $Na_2O$; Type HGB3 is indicative of more than 62 μg and up to 264 μg extracted equivalent of $Na_2O$; Type HGB4 is indicative of more than 264 μg and up to 620 μg extracted equivalent of $Na_2O$; and Type HGB5 is indicative of more than 620 μg and up to 1085 μg extracted equivalent of $Na_2O$. The glass compositions described herein have an ISO 719 hydrolytic resistance of type HGB2 or better with some embodiments having a type HGB1 hydrolytic resistance.

In some embodiments, the glass compositions have an acid resistance of Class S1 or Class S2 according to DIN 12116 both before and after ion exchange strengthening with some embodiments having a Class S1 acid resistance following ion exchange strengthening. In some other embodiments, the glass compositions may have an acid resistance of at least class S2 both before and after ion exchange strengthening with some embodiments having an acid resistance of class S1 following ion exchange strengthening. Further, in some embodiments, the glass compositions have a base resistance according to ISO 695 of Class A1 or Class A2 before and after ion exchange strengthening with some embodiments having a Class A1 base resistance at least after ion exchange strengthening. In some embodiments, glass compositions also have an ISO 720 Type HGA1 hydrolytic resistance both before and after ion exchange strengthening with some embodiments having a Type HGA1 hydrolytic resistance after ion exchange strengthening and some other embodiments having a Type HGA1 hydrolytic resistance both before and after ion exchange strengthening. The glass compositions described herein have an ISO 719 hydrolytic resistance of Type HGB2 with some embodiments having a Type HGB1 hydrolytic resistance.

It should be understood that, when referring to the above referenced classifications according to DIN 12116, ISO 695, ISO 720 and ISO 719, a glass composition or glass article which has "at least" a specified classification means that the performance of the glass composition is as good as or better than the specified classification. For example, a glass article which has a DIN 12116 acid resistance of "at least Class S2" may have a DIN 12116 classification of either S1 or S2.

The glass compositions described herein are formed by mixing a batch of glass raw materials (e.g., powders of $SiO_2$, $Al_2O_3$, alkali oxides, alkaline earth oxides and the like) such that the batch of glass raw materials has the desired composition. Thereafter, the batch of glass raw materials is heated to form a molten glass composition which is subsequently cooled and solidified to form the glass composition. During solidification (i.e., when the glass composition is plastically deformable) the glass composition may be shaped using standard forming techniques to shape the glass composition into a desired final form. Alternatively, the glass article may be shaped into a stock form, such as a sheet, tube or the like, and subsequently reheated and formed into the desired final form.

The glass compositions described herein may be shaped into glass articles having various forms such as, for example, sheets, tubes or the like. However, given the chemical durability of the glass composition, the glass compositions described herein are particularly well suited for use in the formation of glass articles used as glass pharmaceutical packages or pharmaceutical containers for containing pharmaceutical compositions, such as liquids, powders and the like. For example, the glass compositions described herein may be used to form glass containers having various shape forms including, without limitation, Vacutainers®, cartridges, syringes, ampoules, bottles, flasks, phials, tubes, beakers, vials or the like. Moreover, the ability to chemically strengthen the glass compositions through ion exchange can be utilized to improve the mechanical durability of such pharmaceutical packaging or glass articles formed from the glass composition. Accordingly, it should be understood that, in at least one embodiment, the glass compositions are incorporated in a pharmaceutical package in order to improve the chemical durability and/or the mechanical durability of the pharmaceutical packaging.

Examples

The embodiments described herein will be further clarified by the following examples.

Glasses having the compositions (mol. %) listed in Table 1 were melted and annealed. Thereafter, the properties of the glasses were determined including CTE ($\times 10^{-7} K^{-1}$), hydrolytic resistance according to ISO 720 (μg extracted equivalent of $Na_2O$ per gram of glass tested), acid resistance according to DIN 12116 ($mg/dm^2$), and base resistance according to ISO 695 ($mg/dm^2$). The values for each of these properties are reported in Table 2. In addition, approximately 1 mm thick plates of the glasses were subjected to ion exchange strengthening by placing the glass in a bath of molten potassium nitrate ($KNO_3$) at temperatures of 450° C. for 16 hours, 500° C. for 8 hours, and 500 for 16 hours. The maximum surface compressive stress ($CS_0$, in MPa) was measured as described herein, as was the depth of layer (DOL, in μm). It is noted that the maximum central tension ($CT_{max}$) is the quotient of $Cs_0$ and the thickness of the glass sample. The surface compressive stress is reported in Table 2. The data in Table 2 were then used as a basis for the models set forth in Equations 1-4 above.

TABLE 1

| | Composition (Mol. %) | | | | | | | | | |
|---|---|---|---|---|---|---|---|---|---|---|
| Ex. | $SiO_2$ | $Al_2O_3$ | $B_2O_3$ | $Na_2O$ | $K_2O$ | MgO | CaO | BaO | Cl | F |
| 1 | 81.8 | 1.2 | 9.1 | 6.0 | 0.5 | 0.2 | 1.0 | 0.0 | 0.2 | 0.0 |
| 2 | 80.2 | 3.0 | 9.0 | 6.0 | 0.5 | 0.2 | 1.0 | 0.0 | 0.2 | 0.0 |
| 3 | 78.5 | 4.4 | 9.0 | 6.0 | 0.5 | 0.2 | 1.0 | 0.0 | 0.2 | 0.0 |
| 4 | 80.8 | 1.2 | 10.2 | 5.9 | 0.4 | 0.2 | 1.0 | 0.0 | 0.2 | 0.0 |
| 5 | 78.9 | 3.0 | 10.2 | 5.9 | 0.5 | 0.2 | 1.0 | 0.0 | 0.2 | 0.0 |
| 6 | 78.0 | 3.0 | 10.2 | 6.9 | 0.5 | 0.2 | 1.0 | 0.0 | 0.2 | 0.0 |
| 7 | 77.4 | 4.4 | 10.3 | 6.0 | 0.5 | 0.2 | 1.0 | 0.0 | 0.3 | 0.0 |
| 8 | 79.5 | 1.2 | 11.4 | 6.0 | 0.5 | 0.2 | 1.0 | 0.0 | 0.2 | 0.0 |
| 9 | 77.7 | 2.9 | 11.4 | 6.0 | 0.5 | 0.2 | 1.0 | 0.0 | 0.2 | 0.0 |
| 10 | 76.3 | 4.5 | 11.4 | 5.9 | 0.5 | 0.2 | 1.0 | 0.0 | 0.2 | 0.0 |
| 11 | 81.0 | 1.2 | 9.0 | 6.9 | 0.5 | 0.2 | 1.0 | 0.0 | 0.2 | 0.0 |
| 12 | 78.0 | 3.0 | 10.3 | 6.9 | 0.5 | 0.2 | 1.0 | 0.0 | 0.2 | 0.0 |
| 13 | 79.0 | 3.0 | 9.1 | 7.0 | 0.5 | 0.2 | 1.0 | 0.0 | 0.2 | 0.0 |
| 14 | 77.5 | 4.5 | 9.1 | 7.0 | 0.5 | 0.2 | 1.0 | 0.0 | 0.3 | 0.0 |
| 15 | 79.8 | 1.2 | 10.2 | 6.9 | 0.4 | 0.2 | 1.0 | 0.0 | 0.2 | 0.0 |
| 16 | 78.0 | 3.0 | 10.2 | 6.9 | 0.4 | 0.2 | 1.0 | 0.0 | 0.2 | 0.0 |
| 17 | 76.3 | 4.5 | 10.3 | 7.0 | 0.5 | 0.2 | 1.0 | 0.0 | 0.2 | 0.0 |
| 18 | 78.8 | 1.2 | 11.3 | 6.8 | 0.4 | 0.2 | 1.0 | 0.0 | 0.2 | 0.0 |
| 19 | 76.9 | 3.0 | 11.3 | 6.9 | 0.5 | 0.2 | 1.0 | 0.0 | 0.3 | 0.0 |
| 20 | 75.4 | 4.5 | 11.2 | 7.0 | 0.5 | 0.2 | 1.0 | 0.0 | 0.3 | 0.0 |
| 21 | 80.0 | 1.2 | 9.0 | 7.9 | 0.5 | 0.2 | 1.0 | 0.0 | 0.2 | 0.0 |
| 22 | 78.0 | 3.0 | 9.1 | 7.9 | 0.5 | 0.2 | 1.0 | 0.0 | 0.2 | 0.0 |
| 23 | 76.5 | 4.5 | 9.1 | 8.0 | 0.5 | 0.2 | 1.0 | 0.0 | 0.2 | 0.0 |
| 24 | 78.0 | 3.0 | 10.3 | 6.9 | 0.4 | 0.2 | 1.0 | 0.0 | 0.2 | 0.0 |
| 25 | 79.0 | 1.2 | 10.2 | 7.8 | 0.4 | 0.2 | 1.0 | 0.0 | 0.2 | 0.0 |
| 26 | 77.1 | 3.0 | 10.3 | 7.8 | 0.4 | 0.2 | 1.0 | 0.0 | 0.2 | 0.0 |
| 27 | 75.3 | 4.5 | 10.3 | 8.0 | 0.5 | 0.2 | 1.0 | 0.0 | 0.3 | 0.0 |
| 28 | 78.1 | 1.2 | 11.2 | 7.6 | 0.4 | 0.2 | 1.0 | 0.0 | 0.2 | 0.0 |
| 29 | 76.0 | 3.0 | 11.4 | 7.8 | 0.4 | 0.2 | 1.0 | 0.0 | 0.2 | 0.0 |
| 30 | 74.3 | 4.5 | 11.4 | 7.9 | 0.5 | 0.2 | 1.0 | 0.0 | 0.2 | 0.1 |
| 31 | 75.0 | 3.4 | 6.0 | 9.1 | 1.2 | 3.1 | 1.1 | 1.0 | 0.2 | 0.0 |
| 32 | 74.9 | 3.3 | 6.1 | 9.2 | 1.2 | 3.6 | 1.6 | 0.0 | 0.2 | 0.0 |
| 33 | 74.9 | 3.4 | 7.2 | 9.2 | 1.1 | 3.0 | 1.0 | 0.0 | 0.2 | 0.0 |
| 34 | 74.4 | 5.0 | 8.3 | 10.3 | 0.4 | 0.2 | 1.0 | 0.0 | 0.2 | 0.0 |
| 35 | 74.9 | 1.6 | 8.2 | 10.0 | 0.4 | 3.4 | 1.3 | 0.0 | 0.2 | 0.0 |
| 36 | 76.7 | 2.9 | 4.9 | 6.0 | 0.5 | 5.5 | 3.2 | 0.0 | 0.3 | 0.0 |

TABLE 2

| | Properties | | | | |
|---|---|---|---|---|---|
| Ex. | CTE | ISO720 avg | DIN 12116 | ISO 695 | $CS_o$ |
| 1 | 45.5 | 0.105 | −0.345 | −81.9 | 403.6 |
| 2 | 47.2 | 0.041 | −0.460 | −93.7 | 428.5 |
| 3 | 45.6 | 0.024 | −0.569 | −118.0 | 537.6 |
| 4 | 45.5 | 0.269 | −0.673 | −92.4 | 380.1 |
| 5 | 47.2 | 0.044 | −0.616 | −111.7 | 378.9 |
| 6 | 50.4 | 0.053 | −0.487 | −102.6 | 472.0 |
| 7 | 47.0 | 0.028 | −0.923 | | 405.8 |
| 8 | 45.8 | 0.588 | −2.748 | −116.3 | 339.9 |
| 9 | 47.2 | 0.058 | −1.534 | −125.1 | 371.4 |
| 10 | 47.7 | 0.035 | −1.771 | −146.8 | 365.9 |
| 11 | 50.2 | 0.089 | −0.317 | −82.6 | 485.1 |
| 12 | 50.4 | 0.042 | −0.653 | −107.5 | 466.5 |

TABLE 2-continued

| | | Properties | | | |
|---|---|---|---|---|---|
| Ex. | CTE | ISO720 avg | DIN 12116 | ISO 695 | $CS_o$ |
| 13 | 51.4 | 0.041 | −0.411 | −94.5 | 490.4 |
| 14 | 52.3 | 0.032 | −0.678 | −108.7 | 483.3 |
| 15 | 49.5 | 0.134 | −0.292 | −93.5 | 468.3 |
| 16 | 51.3 | 0.045 | −0.503 | −108.8 | 462.4 |
| 17 | 50.8 | 0.033 | −1.034 | −122.2 | 481.5 |
| 18 | 49.1 | 0.418 | −0.982 | −108.3 | 443.3 |
| 19 | 50.1 | 0.057 | −1.300 | −119.3 | 470.5 |
| 20 | 51.5 | 0.037 | −2.039 | −131.7 | 468.0 |
| 21 | 53.8 | 0.082 | −0.295 | −81.7 | 520.5 |
| 22 | 54.5 | 0.054 | −0.423 | −93.3 | 548.4 |
| 23 | 53.4 | 0.048 | −0.696 | −101.9 | 457.5 |
| 24 | 49.9 | 0.050 | −0.755 | −103.2 | 449.0 |
| 25 | 52.5 | 0.155 | −0.413 | −88.4 | 539.9 |
| 26 | 54.3 | 0.056 | −0.621 | −105.7 | 539.5 |
| 27 | 54.7 | 0.046 | −1.036 | −121.5 | 533.0 |
| 28 | 51.0 | 0.223 | −0.583 | −102.4 | 523.7 |
| 29 | 53.4 | 0.067 | −0.828 | −114.0 | 502.5 |
| 30 | 53.4 | 0.057 | −2.063 | −128.6 | 527.3 |
| 31 | 66.6 | 0.093 | −0.384 | −81.8 | 725.5 |
| 32 | 65.6 | 0.102 | −0.408 | −80.4 | 702.3 |
| 33 | 63.9 | 0.091 | −0.453 | −88.0 | 670.7 |
| 34 | 62.4 | 0.068 | | −93.8 | 656.5 |
| 35 | 63.9 | 0.149 | −0.334 | −81.4 | 688.9 |
| 36 | 52.4 | 0.082 | −0.649 | −71.5 | 459.8 |

As validation, the compositions of Examples 1-36 were then individually evaluated according to Equations 1~4 to determine the values for ISO 720, DIN 12116, and ISO 695 for each glass sample. The maximum central tension for each glass sample was also calculated. Through these calculations, it was determined that there is reasonable correlation between the measured and calculated values. Accordingly, Equations 1-4 can be used to predict the maximum central tension of a glass composition as well as values for ISO 720, DIN 12116, and ISO 695. In this way, a glass composition can be specifically tailored to meet desired performance criteria, such as, for example, a glass composition having a maximum central tension of greater than 13 MPa.

It should now be understood that the borosilicate glass compositions described herein, and the glass articles formed therefrom, are chemically durable and also amenable to strengthening by ion exchange. Given the chemically durability of the glass, the glass compositions described herein are particularly well suited for use as pharmaceutical packages. Moreover, because the glass is capable of achieving a central tension of greater than or equal to 13 MPa, the glass pharmaceutical packages formed from the borosilicate glass compositions described herein are capable of self-elimination when the hermeticity of the glass pharmaceutical package is breached, thereby mitigating the risk that the contents of the glass pharmaceutical package are used or consumed if the sterility is potentially compromised.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A glass article comprising:
   greater than or equal to 70 mol. % and less than or equal to 82 mol. % $SiO_2$;
   greater than or equal to 1 mol. % and less than or equal to 6 mol. % $Al_2O_3$;
   greater than or equal to 3 mol. % and less than or equal to 16 mol. % $B_2O_3$;
   greater than or equal to 5 mol. % and less than or equal to 12 mol. % $Na_2O$;
   greater than or equal to 0.3 mol % and less than or equal to 2.5 mol % $K_2O$;
   greater than or equal to 6 mol. % and less than or equal to 12 mol. % $R_2O$, where R is K, Li, and Na and wherein the ratio $((R_2O-Al_2O_3)/B_2O_3)$ is greater than or equal to 0.7;
   and at least one alkaline earth oxide in an amount greater than or equal to 0 mol. % and less than or equal to 10 mol. % of alkaline earth oxide, wherein:
   the glass article is capable of being strengthened by ion exchange;
   the glass article has a thickness t; and
   the glass article satisfies the relationship, in mol. %, $13 \leq 0.0308543*(188.5+((23.84*Al_2O_3)+(-16.97*B_2O_3)+(69.10*Na_2O)+(-213.3*K_2O))+((Na_2O-7.274)^2*(-7.3628)+(Al_2O_3-2.863)*(K_2O-0.520)*(321.5)+(B_2O_3-9.668)*(K_2O-0.520)*(-39.74)))/t$, and
   wherein the glass article satisfies the relationship, in mol. %, $0.10 > -0.5963+((-0.1996*Al_2O_3)+(0.06393*B_2O_3)+(0.9536*K_2O)+(0.1498*CaO))+((Al_2O_3-2.953)^2*(0.03741))+((Al_2O_3-2.953)*(B_2O_3-9.653)*(-0.04407))+((Al_2O_3-2.953)*(K_2O-0.5185)*(-1.547))+((Al_2O_3-2.953)*(CaO-1.078)*(-0.7488))$.

2. The glass article of claim 1, wherein $SiO_2$ is greater than or equal to 73 mol. % and less than or equal to 81 mol. %.

3. The glass article of claim 1, wherein $SiO_2$ is greater than or equal to 74 mol. % and less than or equal to 81 mol. %.

4. The glass article of claim 1, wherein $Na_2O$ is greater than or equal to 8 mol. % and less than or equal to 11 mol. %.

5. The glass article of claim 1, wherein $Na_2O$ is greater than or equal to 5 mol. % and less than or equal to 10 mol. %.

6. The glass article of claim 1, wherein $K_2O$ is greater than or equal to 0.3 mol. % and less than or equal to 1.5 mol. %.

7. The glass article of claim 6, wherein $K_2O$ is greater than or equal to 0.3 mol. % and less than or equal to 1.0 mol. %.

8. The glass article of claim 1, wherein $Al_2O_3$ is greater than or equal to 3 mol. % and less than or equal to 6 mol. %.

9. The glass article of claim 1, wherein $Al_2O_3$ is greater than or equal to 1 mol. % and less than or equal to 5 mol. %.

10. The glass article of claim 1, wherein $B_2O_3$ is greater than or equal to 4 mol. % and less than or equal to 11 mol. %.

11. The glass article of claim 1, wherein $B_2O_3$ is greater than or equal to 5 mol. % and less than or equal to 10 mol. %.

12. The glass article of claim 1, wherein the at least one alkaline earth oxide comprises MgO in an amount greater than or equal to 0.1 mol. % and less than or equal to 6.0 mol. %.

13. The glass article of claim 12, wherein MgO is greater than or equal to 0.15 mol. % and less than or equal to 6.0 mol. %.

14. The glass article of claim 12, wherein MgO is greater than or equal to 0.15 mol. % and less than or equal to 4.0 mol. %.

15. The glass article of claim 1, wherein the at least one alkaline earth oxide comprises CaO in an amount greater than or equal to 0 mol. % and less than or equal to 4 mol. %.

16. The glass article of claim 15, wherein CaO is greater than or equal to 0.5 mol. % and less than or equal to 2 mol. %.

17. The glass article of claim 15, wherein CaO is greater than or equal to 0.5 mol. % and less than or equal to 3.5 mol. %.

18. The glass article of claim 1, wherein the at least one alkaline earth oxide comprises BaO in an amount greater than or equal to 0.0 mol. % and less than or equal to 1.5 mol. %.

19. The glass article of claim 18, BaO is greater than or equal to 0.5 mol. % and less than or equal to 1.0 mol. %.

20. The glass article of claim 18, BaO is greater than or equal to 0.5 mol. % and less than or equal to 0.75 mol. %.

21. The glass article of claim 1, wherein:
the glass article satisfies the relationship, in mol. %, $1.5>225.3+((-2.237*SiO_2)+(-1.935*Al_2O_3)+(-2.577*B_2O_3)+(-2.032*Na_2O)+(-10.52*K_2O)+(-2.600*MgO)+(-1.2308*BaO))+((Al_2O_3-2.892)^2*(-0.1001)+(B_2O_3-9.623)^2*(-0.2122)+(Al_2O_3-2.892)*(Na_2O-7.153)*(-0.08707)+(Al_2O_3-2.892)*(K_2O-0.5214)*(6.898)+(Na_2O-7.153)*(K_2O-0.5214)*(3.7587))$.

22. The glass article of claim 1, wherein:
the glass article satisfies the relationship, in mol. %, $0.7>225.3+((-2.237*SiO_2)+(-1.935*Al_2O_3)+(-2.577*B_2O_3)+(-2.032*Na_2O)+(-10.52*K_2O)+(-2.600*MgO)+(-1.2308*BaO))+((Al_2O_3-2.892)^2*(-0.1001)+(B_2O_3-9.623)^2*(-0.2122)+(Al_2O_3-2.892)*(Na_2O-7.153)*(-0.08707)+(Al_2O_3-2.892)*(K_2O-0.5214)*(6.898)+(Na_2O-7.153)*(K_2O-0.5214)*(3.7587))$.

23. The glass article of claim 1, wherein:
the glass article satisfies the relationship, in mol. %, $175>-91.26+((1.049*SiO_2)+(-8.270*Al_2O_3)+(-10.18*B_2O_3)+(4.745*Na_2O)+(-3.051*MgO)+(SiO_2-77.59)^2*(-0.8365)+(Al_2O_3-2.912)*(B_2O_3-9.617)*(1.649)+(Al_2O_3-2.912)*(Na_2O-7.294)*(3.573)+(B_2O_3-9.617)*(Na_2O-7.294)*(2.789)+(Na_2O-7.294)*(MgO-0.6991)*(2.294))$.

24. The glass article of claim 1, wherein
$SiO_2$ is greater than or equal to 74 mol. %; and
the alkaline earth oxide comprises MgO in an amount greater than or equal to 0.10 mol. %.

25. A glass article comprising:
greater than or equal to 73 mol. % and less than or equal to 81 mol. % $SiO_2$;
greater than or equal to 3 mol. % and less than or equal to 6 mol. % $Al_2O_3$;
greater than or equal to 4 mol. % and less than or equal to 11 mol. % $B_2O_3$;
greater than or equal to 8 mol. % and less than or equal to 11 mol. % $Na_2O$;
greater than or equal to 0.30 mol. % and less than or equal to 1.5 mol. % $K_2O$;
greater than or equal to 0.10 mol. % and less than or equal to 6.00 mol. % MgO; and
greater than or equal to 0.50 mol. % and less than or equal to 4.0 mol. % CaO, wherein:

the glass article is capable of being strengthened by ion exchange;
the glass article has a thickness t; and
wherein the glass article satisfies the relationship, in mol. %, $13\leq0.0308543*(188.5+((23.84*Al_2O_3)+(-16.97*B_2O_3)+(69.10*Na_2O)+(-213.3*K_2O))+((Na_2O-7.274)^2*(-7.3628)+(Al_2O_3-2.863)*(K_2O-0.520)*(321.5)+(B_2O_3-9.668)*(K_2O-0.520)*(-39.74)))/t$, and
wherein the glass article satisfies the relationship, in mol. %, $0.10>-0.5963+((-0.1996*Al_2O_3)+(0.06393*B_2O_3)+(0.9536*K_2O)+(0.1498*CaO))+((Al_2O_3-2.953)^2*(0.03741))+((Al_2O_3-2.953)*(B_2O_3-9.653)*(-0.04407))+((Al_2O_3-2.953)*(K_2O-0.5185)*(-1.547))+((Al_2O_3-2.953)*(CaO-1.078)*(-0.7488))$.

26. The glass article of claim 25, wherein MgO is greater than or equal to 0.15 mol. % and less than or equal to 6.00 mol. %.

27. The glass article of claim 25, wherein:
$SiO_2$ is greater than or equal to 73 mol. % and less than or equal to 75 mol. %;
$Al_2O_3$ is greater than or equal to 3 mol. %;
$B_2O_3$ is greater than or equal to 5 mol. % and less than or equal to 10 mol. %;
$Na_2O$ is greater than or equal to 5 mol. % and less than or equal to 10 mol. %;
MgO is greater than or equal to 0.15 mol. % and less than or equal to 4.00 mol. %; and
CaO is less than or equal to 2 mol. %.

28. The glass article of claim 25, wherein:
$SiO_2$ is greater than or equal to 73 mol. % and less than or equal to 80 mol. %;
$Al_2O_3$ is less than or equal to 5 mol. %;
$Na_2O$ is less than or equal to 10 mol. %;
$K_2O$ is less than or equal to 1.0 mol. %;
MgO is greater than or equal to 0.15 mol. %; and
CaO is less than or equal to 3.5 mol. %.

29. The glass article of claim 25, wherein:
the glass article satisfies the relationship, in mol. %, $1.5>225.3+((-2.237*SiO_2)+(-1.935*Al_2O_3)+(-2.577*B_2O_3)+(-2.032*Na_2O)+(-10.52*K_2O)+(-2.600*MgO)+(-1.2308*BaO))+((Al_2O_3-2.892)^2*(-0.1001)+(B_2O_3-9.623)^2*(-0.2122)+(Al_2O_3-2.892)*(Na_2O-7.153)*(-0.08707)+(Al_2O_3-2.892)*(K_2O-0.5214)*(6.898)+(Na_2O-7.153)*(K_2O-0.5214)*(3.7587))$.

30. The glass article of claim 25, wherein:
the glass article satisfies the relationship, in mol. %, $0.7>225.3+((-2.237*SiO_2)+(-1.935*Al_2O_3)+(-2.577*B_2O_3)+(-2.032*Na_2O)+(-10.52*K_2O)+(-2.600*MgO)+(-1.2308*BaO))+((Al_2O_3-2.892)^2*(-0.1001)+(B_2O_3-9.623)^2*(-0.2122)+(Al_2O_3-2.892)*(Na_2O-7.153)*(-0.08707)+(Al_2O_3-2.892)*(K_2O-0.5214)*(6.898)+(Na_2O-7.153)*(K_2O-0.5214)*(3.7587))$.

31. The glass article of claim 25, wherein:
the glass article satisfies the relationship, in mol. %, $175>-91.26+((1.049*SiO_2)+(-8.270*Al_2O_3)+(-10.18*B_2O_3)+(4.745*Na_2O)+(-3.051*MgO)+(SiO_2-77.59)^2*(-0.8365)+(Al_2O_3-2.912)*(B_2O_3-9.617)*(1.649)+(Al_2O_3-2.912)*(Na_2O-7.294)*(3.573)+(B_2O_3-9.617)*(Na_2O-7.294)*(2.789)+(Na_2O-7.294)*(MgO-0.6991)*(2.294))$.

32. The glass article of claim 29, further comprising BaO in an amount greater than or equal to 0.0 mol. % and less than or equal to 1.5 mol. %.

33. A glass article comprising:
greater than or equal to 73 mol. % and less than or equal to 81 mol. % $SiO_2$;
greater than or equal to 3 mol. % and less than or equal to 6 mol. % $Al_2O_3$;
greater than or equal to 4 mol. % and less than or equal to 11 mol. % $B_2O_3$;
greater than or equal to 8 mol. % and less than or equal to 11 mol. % $Na_2O$;
greater than or equal to 0.30 mol. % and less than or equal to 1.5 mol. % $K_2O$;
greater than or equal to 0.5 mol. % and less than or equal to 1.0 mol. % BaO;
greater than or equal to 0.10 mol. % and less than or equal to 6.00 mol. % MgO; and
greater than or equal to 0.50 mol. % and less than or equal to 4.0 mol. % CaO, wherein:
the glass article is capable of being strengthened by ion exchange;
the glass article has a thickness t; and
wherein the glass article satisfies the relationship, in mol. %, $13 \leq 0.0308543*(188.5+((23.84*Al_2O_3)+(-16.97*B_2O_3)+(69.10*Na_2O)+(-213.3*K_2O))+((Na_2O-7.274)*(-7.3628)+(Al_2O_3-2.863)*(K_2O-0.520)*(321.5)+(B_2O_3-9.668)*(K_2O-0.520)*(-39.74)))/t$,
wherein the glass article satisfies the relationship, in mol. %, $0.7 > 225.3+((-2.237*SiO_2)+(-1.935*Al_2O_3)+(-2.577*B_2O_3)+(-2.032*Na_2O)+(-10.52*K_2O)+(-2.600*MgO)+(-1.2308*BaO))+((Al_2O_3-2.892)^2*(-0.1001)+(B_2O_3-9.623)^2*(-0.2122)+(Al_2O_3-2.892)*(Na_2O-7.153)*(-0.08707)+(Al_2O_3-2.892)*(K_2O-0.5214)*(6.898)+(Na_2O-7.153)*(K_2O-0.5214)*(3.7587))$.

34. The glass article of claim 32, wherein BaO is greater than or equal to 0.5 mol. % and less than or equal to 0.75 mol. %.

35. A glass article comprising:
greater than or equal to 73 mol. % and less than or equal to 81 mol. % $SiO_2$;
greater than or equal to 3 mol. % and less than or equal to 6 mol. % $Al_2O_3$;
greater than or equal to 4 mol. % and less than or equal to 11 mol. % $B_2O_3$;
greater than or equal to 8 mol. % and less than or equal to 11 mol. % $Na_2O$;
greater than or equal to 0.30 mol. % and less than or equal to 1.5 mol. % $K_2O$;
greater than or equal to 0.5 mol. % and less than or equal to 0.75 mol. % BaO;
greater than or equal to 0.10 mol. % and less than or equal to 6.00 mol. % MgO; and
greater than or equal to 0.50 mol. % and less than or equal to 4.0 mol. % CaO, wherein:
the glass article is capable of being strengthened by ion exchange;
the glass article has a thickness t; and
wherein the glass article satisfies the relationship, in mol. %, $13 \leq 0.0308543*(188.5+((23.84*Al_2O_3)+(-16.97*B_2O_3)+(69.10*Na_2O)+(-213.3*K_2O))+((Na_2O-7.274)^2*(-7.3628)+(Al_2O_3-2.863)*(K_2O-0.520)*(321.5)+(B_2O_3-9.668)*(K_2O-0.520)*(-39.74)))/t$,
wherein the glass article satisfies the relationship, in mol. %, $1.5 > 225.3+((-2.237*SiO_2)+(-1.935*Al_2O_3)+(-2.577*B_2O_3)+(-2.032*Na_2O)+(-10.52*K_2O)+(-2.600*MgO)+(-1.2308*BaO))+((Al_2O_3-2.892)^2*(-0.1001)+(B_2O_3-9.623)^2*(-0.2122)+(Al_2O_3-2.892)*(Na_2O-7.153)*(-0.08707)+(Al_2O_3-2.892)*(K_2O-0.5214)*(6.898)+(Na_2O-7.153)*(K_2O-0.5214)*(3.7587))$.

* * * * *